June 30, 1953     I. F. MATTHYSSE ET AL     2,643,446
METHOD OF MANUFACTURING ELECTRICAL TERMINAL CONNECTORS
Filed Aug. 5, 1947     5 Sheets-Sheet 1
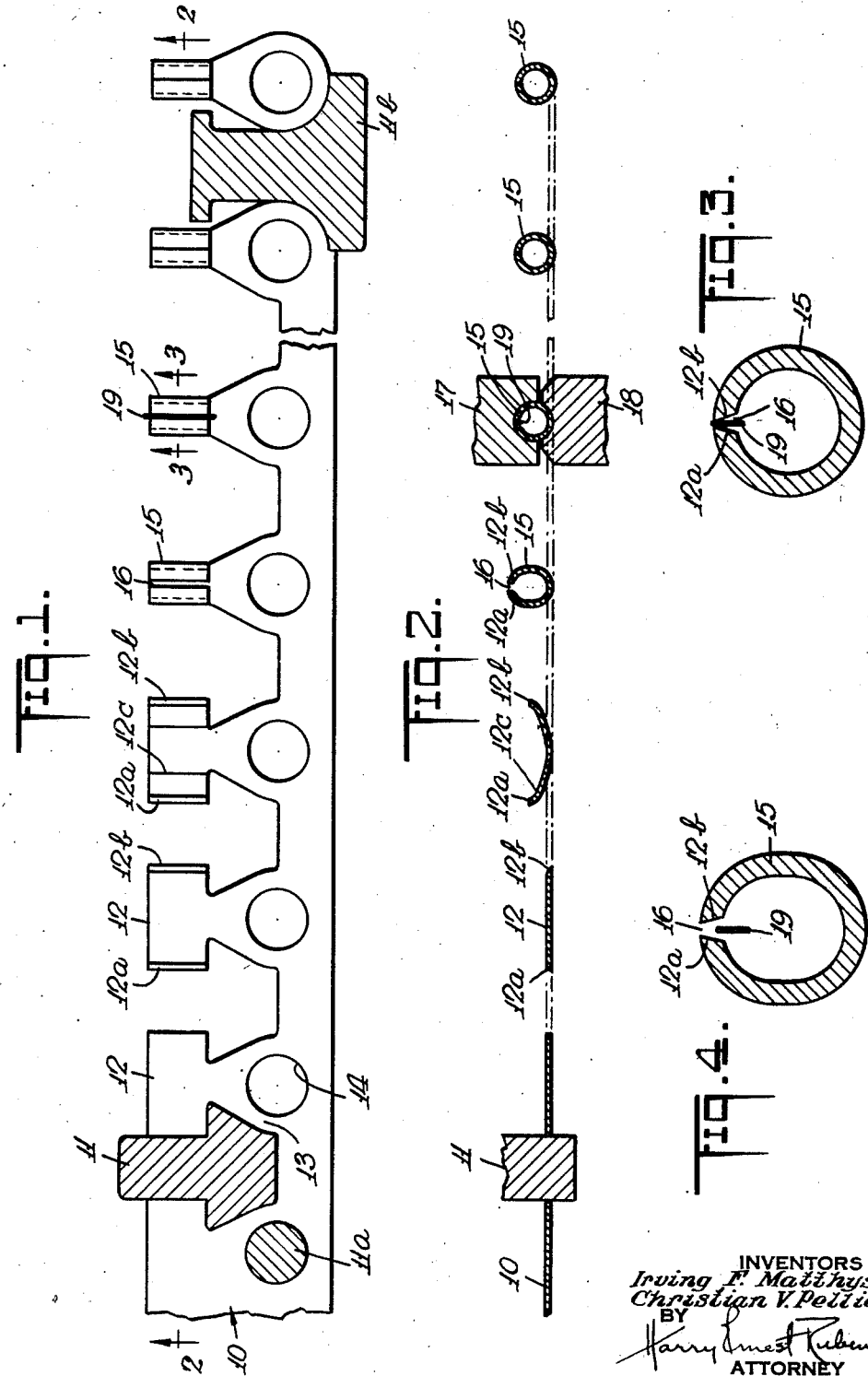
INVENTORS
Irving F. Matthysse
Christian V. Peltier
BY
Harry Ernest Rubens
ATTORNEY June 30, 1953  I. F. MATTHYSSE ET AL  2,643,446
METHOD OF MANUFACTURING ELECTRICAL TERMINAL CONNECTORS
Filed Aug. 5, 1947  5 Sheets-Sheet 2
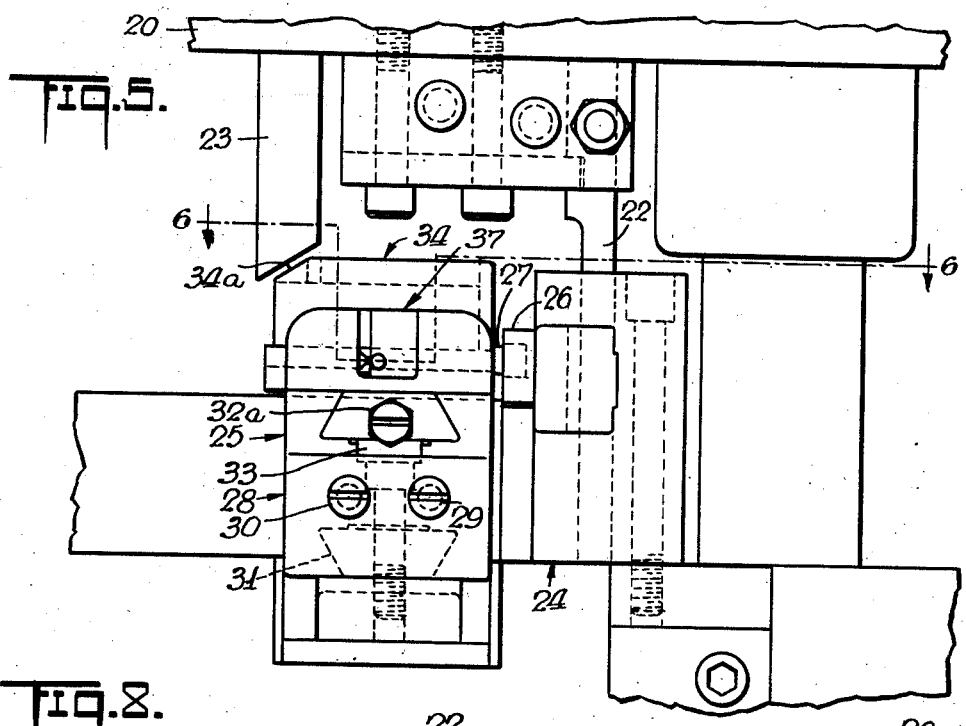
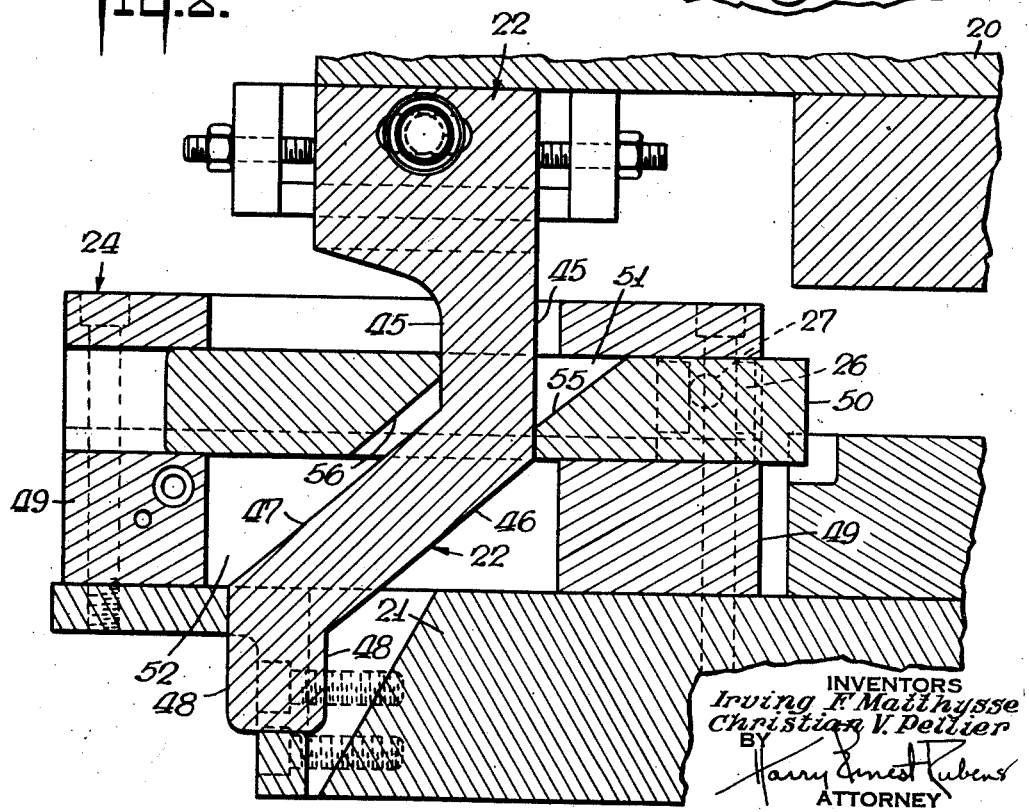
INVENTORS
Irving F. Matthysse
Christian V. Peltier
BY
Harry Ernest Rubens
ATTORNEY

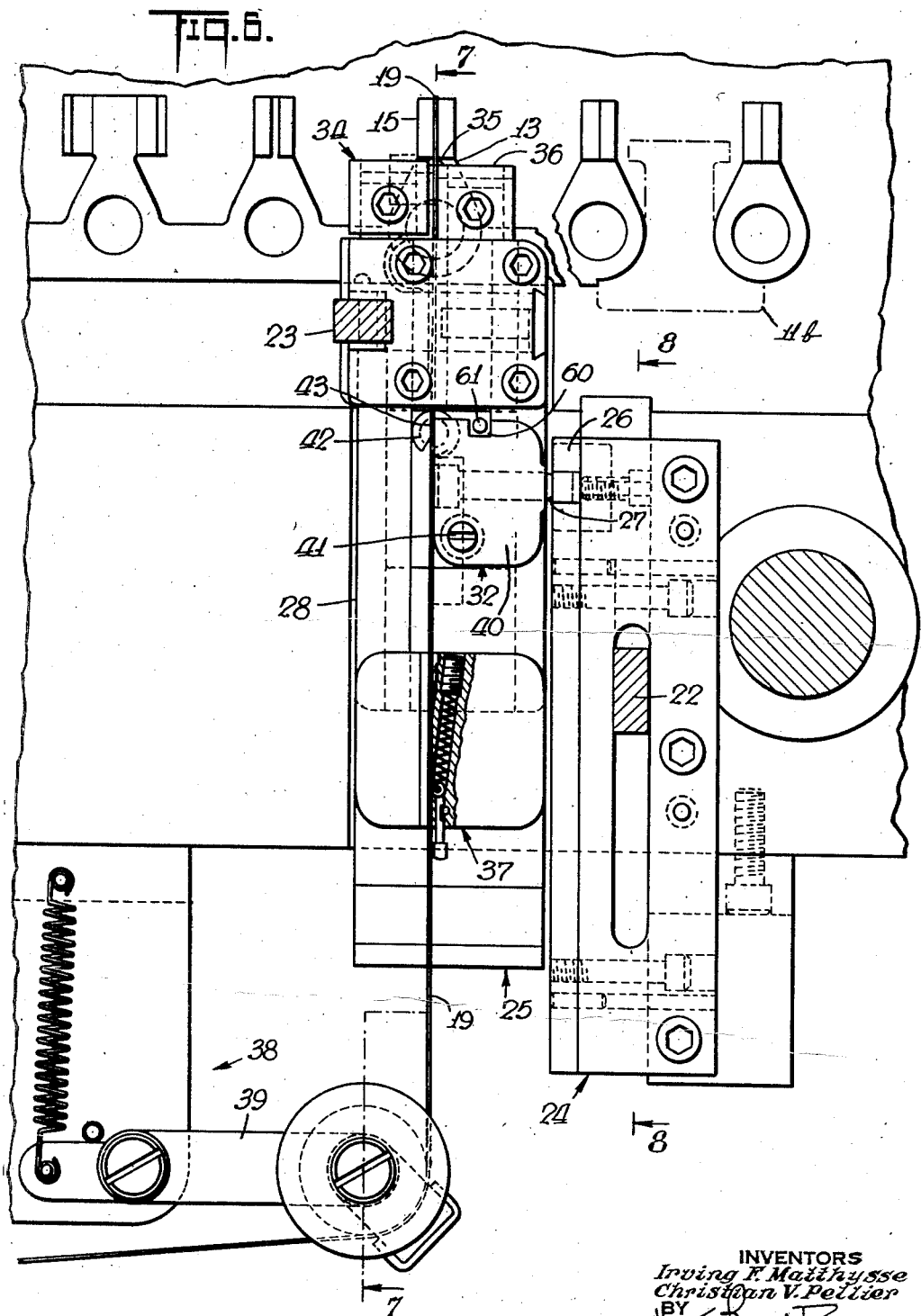

June 30, 1953     I. F. MATTHYSSE ET AL     2,643,446
METHOD OF MANUFACTURING ELECTRICAL TERMINAL CONNECTORS
Filed Aug. 5, 1947     5 Sheets-Sheet 4
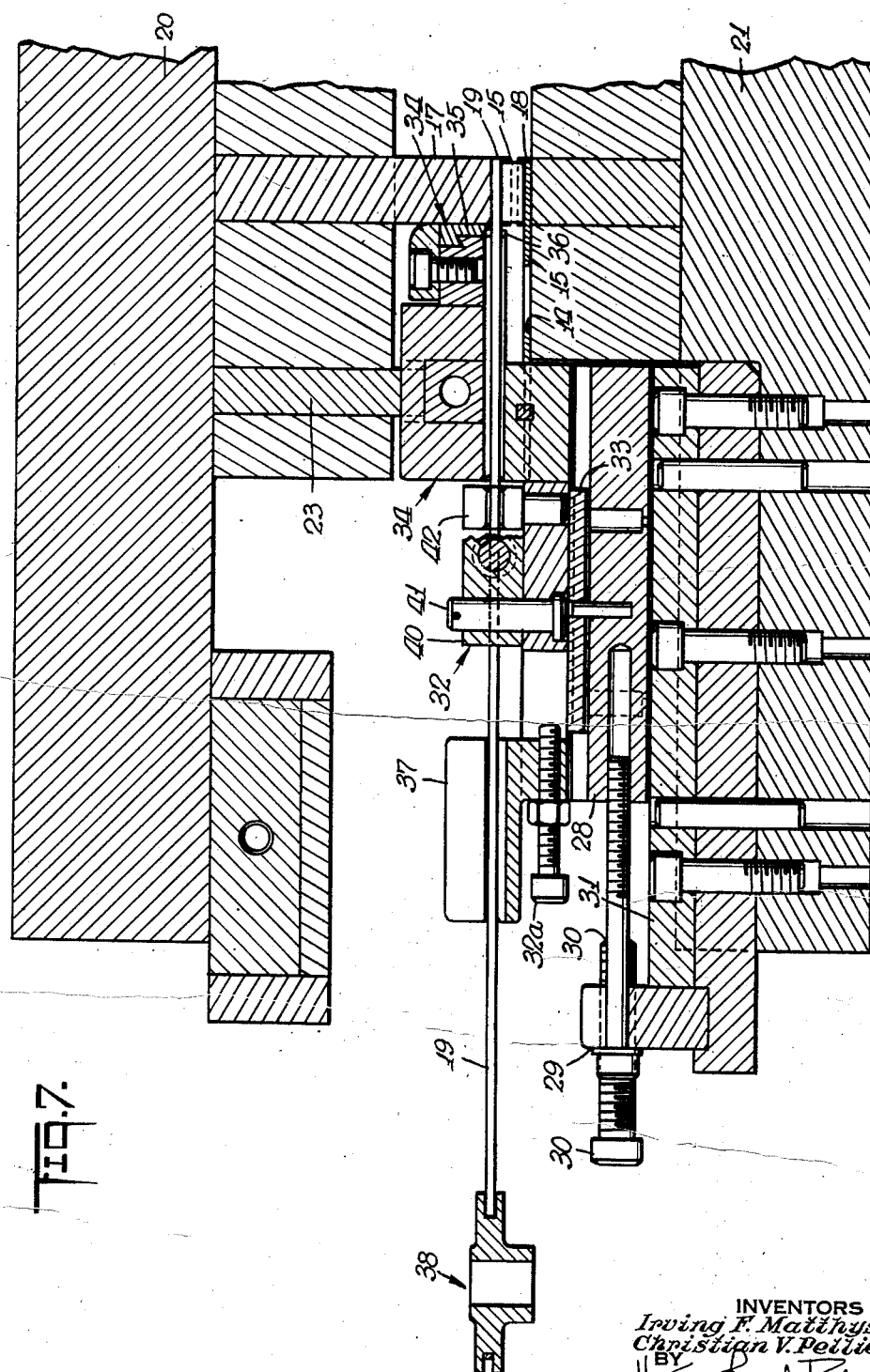

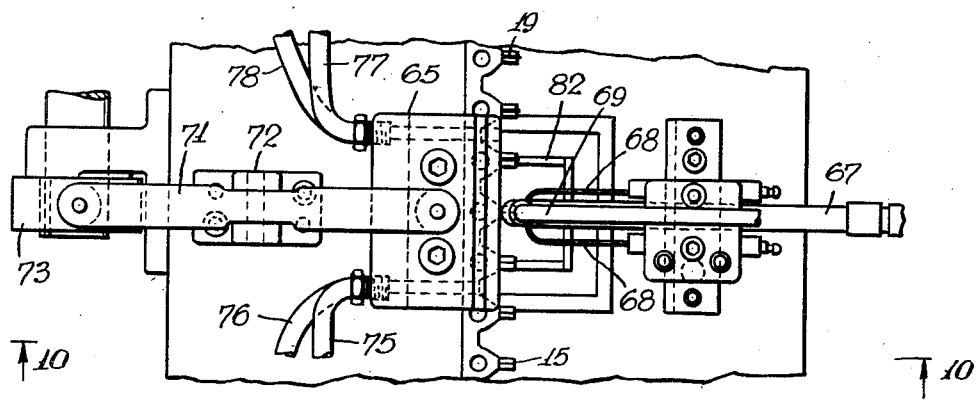
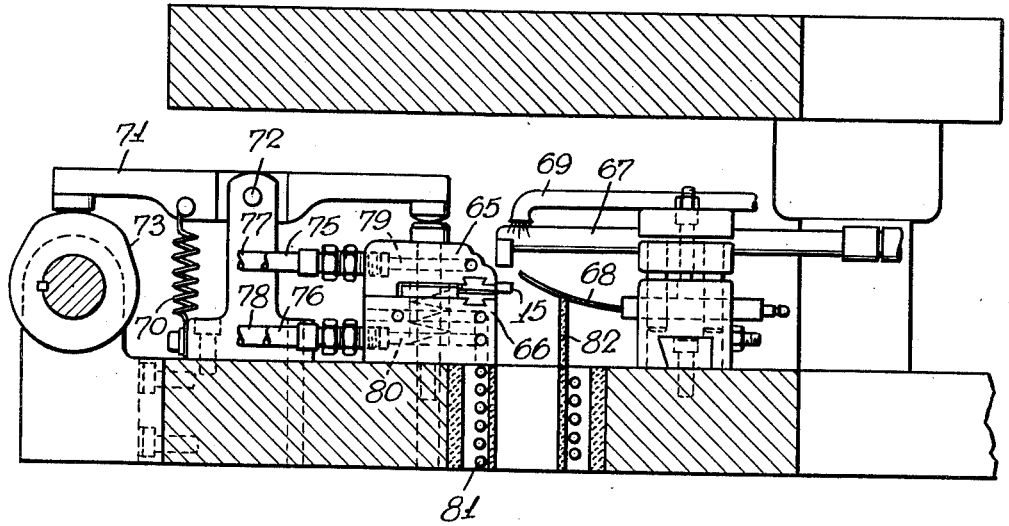

Patented June 30, 1953

2,643,446

UNITED STATES PATENT OFFICE 2,643,446

METHOD OF MANUFACTURING ELECTRICAL TERMINAL CONNECTORS

Irving F. Matthysse and Christian V. Pellier, New York, N. Y., assignors to Burndy Engineering Co. Inc., a corporation of New York Application August 5, 1947, Serial No. 766,150

3 Claims. (Cl. 29—155.55)

Our invention relates to the automatic production of brazed sheet-metal tubes to be used in place of seamless tubing. Such tubing may be utilized in various fields, an example being the electrical connector art.

Wire terminals formed from copper tubing are limited in the variety of flat contact tongue shapes to those which may be formed from the tubing by flattening. For this reason it is desirable to form such terminals from flat sheet metal which has the additional advantage of lower cost per pound of material.

One method of utilizing sheet metal is to form the sheet into a tubular barrel having a longitudinal seam. To prevent this seam from opening upon indenting the barrel to grip the wire, one means employed is to place a small cylinder of metal over this barrel. This method is costly and adds to the bulk of the terminal. Another method is to braze the seam by the use of standard brazing alloys such as silver solder. It has been found that properly brazed seams are strong enough to receive an indentation directly into the seam without splitting.

A common method for brazing such a seam is to heat the object sufficiently to melt the brazing material and then touch the brazing material, usually in the form of a rod, to the seam, until a sufficient quantity melts and fills the seam. Obviously such a method would be costly for large quantity production.

To reduce the cost of brazing appreciably the brazing must be done automatically during or after the forming of the terminal without any additional handling operation for the brazing. Therefore, it is an object of this invention to provide a means of automatically inserting brazing material into the seam of the barrel of a terminal during the forming of the terminal in progressive dies or the like.

The barrels of the terminals, having brazing material inserted in the seams, must be heated to flow the brazing material to form a bond across the seam. For this purpose the terminals may be taken in bulk and placed in an oven, but this is an additional handling operation and one having the danger that the handling may cause some terminals to lose their brazing material. It is a further object of this invention to provide a means for automatically heating the barrels of these terminals after the insertion of the brazing material during, or immediately after the forming of the terminals in a progressive die or the like, without a separate handling operation.

For some applications, it is desirable for the contact tongue of a terminal to be of hard metal for rigidity or resilience or both. If such a terminal is formed from hard sheet metal and the seam in the barrel is brazed, the heat of brazing will tend to soften or anneal the contact tongue thus destroying its resilience.

A still further object of this invention consists in providing a method whereby the barrel of a terminal, formed from relatively hard sheet metal, may be brazed without any appreciable annealing of the metal of the contact tongue. It is an additional object of this invention to provide a means for automatically heating the barrels of terminals after the automatic insertion of brazing material in the seams of the barrels, during or after the forming of the terminals in a progressive die or the like, without a separate handling operation and without any appreciable annealing of the contact tongues of the terminals.

Another object is to provide automatic cooling means in the progressive die or the like to keep the tongues of the terminals relatively cool while the barrels are being heated for brazing and thereby preventing annealing of the tongues. Another object is to provide means for heating the barrel of the terminal so rapidly that the brazing is completed before sufficient heat is conducted into the tongue of the terminal to cause annealing.

We accomplish these and other objects and obtain our new results as will be apparent from the device and methods described in the following specification, particularly pointed out in the attached claims, and illustrated in the accompanying drawings, in which:

Fig. 1 is a plan view of a sheet metal strip illustrating the various operations which may be performed upon it during the process of its manufacture into electrical connectors.

Fig. 2 is a longitudinal sectional view of the same taken in the plane 2—2 of Fig. 1 with some of the blanking and forming dies partially shown in cross-section.

Fig. 3 is an enlarged sectional view of the connector barrel portion taken in the plane 3—3 of Fig. 1.

Fig. 4 is a similar view taken just before the die forming operation.

Fig. 5 is an end view of the cross-feed mechanism for inserting a strip of brazing material into the tubular portion of the terminal barrel.

Fig. 6 is a top plan view of the same, partly in section taken through the plane 6—6 of Fig. 5.

Fig. 7 is a sectional view of the cross-feed mechanism taken through the plane 7—7 of Fig. 6.

Fig. 8 is a sectional view of the cross-feed slide which may be employed to operate the cross-feed mechanism taken through the plane 8—8 of Fig. 6.

Fig. 9 is a top plan view of the heating and cooling mechanism for the terminal barrel and tongue resspectively.

Fig. 10 is a sectional view of the same taken through 10—10 of Fig. 9.

*General description of operations*

A strip of sheet metal, from which it is desired to produce the brazed tubular structure, for example, the electrical terminals illustrated, is fed into progressive dies, or similarly functioning apparatus. A number of blanking, piercing, and forming operations may be performed on the sheet metal as it intermittently moves from one station of operation to another, in the dies. The terminals usually remain attached to the sheet metal strip during these operations and are severed from it when the operations are completed.

Sometimes, it may be desirable to sever the terminals from the sheet metal strip before all operations have been completed. In such instances other means must be employed to carry the terminals to the successive operating stations.

The brazing material in the form of a thin, narrow strip is automatically inserted into the seam of the tubular barrel of the terminal during the formation of the barrel and specifically at the closing of the seam. This may be accomplished by feeding the brazing material into the progressive die on a cross feed mechanism adjusted to insert the desired length each time a terminal is in position. After inserting the proper length of brazing material, a die is applied to the barrel, closing the seam thereby pinching the brazing material in position. The brazing material is then severed from the strip. Thereafter the terminal may be carried along to succeeding stations in the progressive die where additional forming, piercing and blanking operations may take place to complete the terminal.

The terminals with the brazing material held squarely in their seams are carried by suitable automatic means to positions where heat is applied to their barrels to melt and flow the brazing material. After the terminals are carried beyond this heating station they cool and the brazing material hardens forming a strong bond across the seams. The heat may be applied by a flame from an acetylene torch, by induction heating, or other means. The heating of the terminal to melt the brazing material may anneal the tubular barrel of the terminal, which is desirable for indenting or crimping to grip the wire. However, other parts of the terminal or connector may also become annealed and this is sometimes undesirable. We have devised metal jaws, which may be water-cooled which engage the surfaces of the tongue portion of the connector keeping the temperature of the tongue portion below the annealing point. The jaws further act as a barrier to the direct heat of the flame. These jaws do not have to grip firmly, but may allow the terminals to slide between them as they pass on to successive stations.

The heat may be applied at a sufficiently high temperature and for such a short period of time, as to cause the brazing material to melt, without allowing much heat to travel back to the tongue section. The barrel of the terminal may thus be heated in the progressive die at a station subsequent to the one in which the brazing material is inserted. It is desirable to heat the terminal while it is still attached to the strip from which it is formed since it is thereby accurately located for applying the heat and it becomes relatively simple to pass it between cooling jaws. The terminals are then carried beyond the heating station to enable them to cool and the brazing material to harden forming a strong bond across the seams. A stamping operation then separates them from the sheet metal strip.

*Detailed description*

In Fig. 1, reference numeral 10 designates the sheet metal strip. A blanking die 11 partially shapes the flat body section 12 and the tongue section 13 while the punch 11a forms the terminal aperture 14 in the tongue. As the strip advances, the two longitudinal edges of the body section are chamfered as at 12a and 12b for a purpose hereinafter explained. Thereafter, the body section is dish-shaped in cross-section as at 12c in Fig. 2, to facilitate the subsequent formation of the U-shaped barrel portion 15 as shown in the next stage, wherein the two chamfered edges 12a and 12b are brought into juxtaposition, forming a slot 16.

Thus the barrel 15 with opened slot 16 is advanced by the strip 10 into the final forming stage illustrated in Figs. 3 and 4, wherein forming dies 17 and 18 close the barrel about a strip of brazing material 19 inserted into the slot 16 and gripped by the chamfered edges 12a and 12b, as shown in Fig. 3. The position of the barrel 15 and material 19 just prior to the full rounding operation of the dies 17 and 18 is shown in Fig. 4.

A sectional view of the mechanism at this point is illustrated in Fig. 7, wherein reference numeral 20 designates the upper movable die shoe and 21 the lower stationary die shoe. Cross-slide cam 22 and brazing material cut-off cam 23 extend from the upper die shoe.

As shown in Figs. 5, 6, 7, and 8, the cam 22 operates a horizontal cross-slide mechanism 24, connected to the feed mechanism 25 by a fork 26 on the slide, engaging the thrust pin 27 on the feed mechanism.

The feed mechanism 25 is made up of a main carriage 28 slidable between forward and backward stops 29 and 30 on the feed mechanism base 31 secured to the lower die part 21 and a feed gripping mechanism 32 mounted thereon, and separated therefrom by the spring actuated friction lock 33.

On the forward end of the main carriage is positioned the projecting cut-off 34 overhanging the tongue of the terminal, which cut-off contains moving blade 35 operating on fixed blade 36. At the rear of the main carriage is the jamming ball brake 37 which locks on the backward movement of the main carriage with the ribbon strip 19 made of brazing material fed from an ordinary strip feeding apparatus 38 of which the illustrated spring loaded arm 39 is a part.

The forward thrust imparted to the thrust pin 27, first causes the feed lever plate 40 of the feed gripping mechanism 32, horizontally pivoted at 41, to operate and pinch the strip 19 between the anvil 42, also mounted on the feed gripping mechanism, and the jaw 43 of the feed lever plate. The feed gripping mechanism, with the strip, being frictionally locked to the main carriage advances with the overhanging cut-off 34, until the main carriage with cut-off 34 encounters the forward stop 29. The frictional lock 33 is then overcome, and the feed gripping mechanism with the strip 19 continues to advance under the imparted thrust, projecting the end of the strip a pre-determined distance beyond the now stationary cut-off 34.

Cut-off cam 23 positioned above the cut-off in this position, operates on the camsurface 34a of moving cut-off blade 35, forcing it horizontally to sever the section inserted into the connector from the main strip 19. On the upstroke of the press, the thrust on pin 27 is reversed in direction and the feed lever plate 40 first opens to release the strip 38, and as the feed-gripping mechanism is carried backward, with the main carriage, ball brake 37 locks to the strip 19, carrying it backward with the cut-off 34.

Upon encountering the backward stop 30, the frictional lock 33 releases the main carriage and the feed-gripping mechanism withdraws until the end of the movement of pin 27 is reached. The mechanism for advancing the sheet metal strip 10 is a standard stock feed, not shown, and the movement of the strip 10 occurs after the projecting cut-off 34 has been withdrawn.

The cross-slide cam 22 and slide mechanism 24 is shown in detail in Fig. 8. The cross-slide cam 22 has upper vertical dwell surfaces 45, oblique forward and backward camming surfaces 46 and 47 respectively, and lower vertical dwell surfaces 48.

The horizontal cross-slide mechanism 24 comprises the stationary frame 49 mounted on the lower die shoe 21, the moving cross-slide member 50 slidably mounted in the frame 49, both apertured at 51 and 52 respectively, to receive the extending cam 22. The slide member has forward and rearward oblique camming surfaces 55 and 56 formed inside the aperture 51.

On the upstroke of the press, the dwell 45 of the cam permits various operations to take place such as clearing cut-off cam 23 from the cut-off. As cam surface 47 engages cam surface 56, the sliding member to which fork 26 is secured, begins to withdraw pin 27 extending from the feed lever plate 40, causing the plate to pivot within the range of cut-out 60 as determined by stop pin 61 mounted on feed gripping mechanism 32. This opens the jaw 43 of the plate from the anvil 42, allowing the feed gripping mechanism, carrying strip 19, to start its backward motion carrying the main carriage 28 with it, withdrawing the overhanging cut-off 34 from its position adjacent to the barrel 15, and immediately above the terminal tongue 13. Thus the work strip 10 may be lifted during this period and its position advanced one station.

At the moment the main carriage starts its backward motion the jamming ball brake 37 engages the brazing strip 19 carrying it backward with the carriage, until the main carriage engages the back stop 30, unlocking the friction lock 33, permitting the feed mechanism 32 to reach its fully retracted position, as determined by adjustable stop 32a.

Upon the downstroke, and immediately after the dwell 48 has completed its movement, the cam surface 46 engages the cam surfaces 55 of the slide member 50 causing pin 27 to reverse its thrust locking the strip 19 between anvil 42 and jaw 43, moving the strip, feed gripping mechanism and main carriage forward until the forward stop 29 is reached which unlocks the main carriage at which time the overhanging cut-off has reached its forward position adjacent the opening of the barrel 15. The forward thrust continues, and carries the feeder gripping mechanism with the brazing material strip with it, projecting it beyond the cut-off mechanism a distance equal to the remaining movement of the thrust pin 27, which by various adjustments hereinafter explained is the distance the strip is projected into the barrel of the connector.

As the strip reaches its final position, the U-shaped tool 17 attached to the movable die shoe 20 engages the barrel, moves toward die 18, causing the two edges 12a and 12b of the barrel to engage the strip 19 therebetween and pinch it in position, while the barrel is finally shaped.

As the dwell 45 is reached, the press continues its downward movement without forward movement of the feed mechanism, thus allowing the cut-off cam 23 to operate the cut-off of the strip severing the pinched-off section from the strip 19.

By means of the adjustable forward stop 29, the ultimate forward position of the cut-off is controlled thus allowing the barrel to be changed in position. The backward stop 30 controls the withdrawn position of the cut-off to allow for adjustments in the position of the sheet metal strip 10.

Since the feed gripping mechanism and the main carriage move a total forward distance substantially equal to the movement of the cross-slide 50, the amount of strip brazing material fed beyond the cut-off is determined by the total forward movement of the cross-slide 50, less the distance the main carriage carrying the cut-off is moved before it reaches the forward stop. This may be varied by adjusting the position of the cross-slide and associated cam parts which are made adjustable for this purpose.

Modifications in the position of the barrel, the forward and backward positions of the cut-off and the length of feed are thus controlled as aforesaid.

When the final shape of the barrel 15 is completed and the sheet metal strip 10 is advanced, the heating operation takes place which melts the brazing material in position filling the seam.

This operation is shown in Figs. 9 and 10 and comprises advancing the terminal tongue portion 13 between springy separated cooling jaws 65 and 66, allowing the barrel portion 15 to project clear therefrom and positioned in a downwardly directed heat, which in the instant construction consists of an oxygen-acetylene torch 67 ignited by the electrode 68. The downwardly directed heat is controlled by the air blast 69.

The upward movement of the cooling jaw 65 is controlled by the spring 70. Its downward movement is effected by the rocker arm 71 pivoted at 72 which is controlled by the rotary cam 73 synchronized with the movement of the sheet metal strip 10. Thus after the terminal tongue is moved into position between the opened jaws, the rotary cam 73 is actuated to compress the jaws into sliding contact with the terminal tongue. The jaws are kept cool by means of water inlet pipes 75 and 76 entering the rear of jaws 65 and 66 respectively and outlet pipes 77 and 78 allowing the water to exit, permitting the cool water to circulate in the hollow chambers 79 and 80 respectively, before being withdrawn. Water cooled coils 81 may be provided in the die shoe and heat insulating barriers 82 may be employed to contain the heat generated within the desired confines.

The jaws may be of the non-moving type spaced apart sufficiently to allow the sheet metal strip 10 containing the tongue sections, to enter, so that the cooling effect is obtained. The jaws may not even be cooled, but simply act as barriers for the flame of the torch to prevent the flame from reaching the tongue sections. Moreover, the jaws may have a considerable width covering tongue sections of terminals not being subjected to the flame. The conduction of the heat away from the tongue section is thus accomplished to prevent the annealing effect of the heat.

The barrel of the terminal remains under the flame for a very short period. A very hot flame is used to heat the barrel very rapidly, and the terminal is quickly moved away. Thus the barrel remains under the hot flame only long enough to flow the brazing material and in that short time a minimum of heat is conducted back into the tongue. In addition to cooling the jaws which grip the tongue, the circulating water prevents heat from the flame from heating the adjacent die parts excessively.

After the heating stage the terminal may continue on to other positions where additional operations are performed. The final operation is the cut-off shown in Fig. 1 wherein the die 11b frees the terminal from the strip if this operation has not already been performed and the terminal is then ready for any surface treatment or plating that is desired.

In the foregoing, we have described the essential elements of a press for obtaining the brazing of two adjacent edges of metal forming a seam. By our method, the brazing material is automatically fed into the seam, the adjacent edges of the seam closed to hold the brazing material firmly in position, the brazing material severed, and the seamed object containing the pinched brazing material automatically moved to a heating position where the seam is brazed.

The press may be additionally provided with means for continuously cooling the die parts supporting the brazed object, as well as parts of the object which it is desired to prevent heating to brazing temperatures. In addition, the flame is prevented by barriers from reaching surfaces not intended to be heated.

We have thus described our invention, but we desire it understood that it is not confined to the particular forms or uses shown and described, the same being merely illustrative, and that the invention may be carried out in other ways without departing from the spirit of our invention and, therefore, we claim broadly the right to employ all equivalent instrumentalities coming within the scope of the appended claims, and by means of which, objects of our invention are attained and new results accomplished, as it is obvious that the particular embodiments here shown and described are only some of the many that can be employed to attain these objects and accomplish these results.

We claim:

1. The method of manufacturing electrical terminal connectors from flat sheet material which comprises the following sequential steps: stamping the sheet material into a blank containing a tongue portion and a connected body portion having two free longitudinal edges all extending laterally from the sheet material, rounding the body portion to bring the two free longitudinal edges into close parallel relationship, moving the blank in a direction at right angles to the axis of the rounded body portion to a brazing strip-inserting station, stopping the movement of the blank, inserting one end of the brazing strip between the free edges of the body portion from a direction at right angles to the direction of movement of the blank, compressing the rounded body portion until the end of the brazing material is uniformly pinched by the entire free edges being simultaneously moved towards each other, cutting off the pinched portion of the brazing material from the extending strip; moving the blank and pinched brazing material in a direction at right angles to the direction in which the brazing material was inserted, heating the brazing material and adjacent edges of the rounded body portion until the material is melted, cooling the blank and melted brazing material and finally severing the tongue portion and connected body portion from the sheet material to form the electrical terminal connector.

2. In the method of claim 1, the step of chamferring the two longitudinal edges of the flat body portion to form downwardly and outwardly extending surfaces from the free edges of the body portion when the body portion is rounded.

3. In the method of claim 1, the step of forming a heat barrier to the heating source positioned between the heating source and the tongue portion when the brazing material on the body portion is heated.

IRVING F. MATTHYSSE.
CHRISTIAN V. PELLIER.

References Cited in the file of this patent

UNITED STATES PATENTS

| Number | Name | Date |
|---|---|---|
| 940,414 | White | Nov. 16, 1909 |
| 1,019,043 | Higgin | Mar. 5, 1912 |
| 1,443,082 | Mauck | Jan. 23, 1923 |
| 1,478,813 | Becker | Dec. 25, 1923 |
| 1,978,235 | Summers | Oct. 23, 1934 |
| 2,007,996 | Baker | July 16, 1935 |
| 2,024,485 | Sussman | Dec. 17, 1935 |
| 2,066,025 | Zublin | Dec. 29, 1936 |
| 2,234,450 | Quarnstrom | Mar. 11, 1941 |
| 2,324,177 | Smith | July 13, 1943 |
| 2,396,956 | Larson | Mar. 19, 1946 |
| 2,450,120 | Cate | Sept. 26, 1948 |
| 2,452,932 | Johnson | Nov. 2, 1948 |
| 2,455,774 | Johnson | Dec. 7, 1948 |

FOREIGN PATENTS

| Number | Country | Date |
|---|---|---|
| 418,604 | Great Britain | Oct. 29, 1934 |